(12) United States Patent
Gu et al.

(10) Patent No.: US 8,457,439 B2
(45) Date of Patent: Jun. 4, 2013

(54) SYSTEM AND METHOD FOR REDUCING ARTIFACTS IN IMAGES

(75) Inventors: Xueming Henry Gu, Burbank, CA (US); Ju Guo, Los Angeles, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 668 days.

(21) Appl. No.: 12/522,438

(22) PCT Filed: Jun. 19, 2007

(86) PCT No.: PCT/US2007/014244
§ 371 (c)(1),
(2), (4) Date: Jul. 8, 2009

(87) PCT Pub. No.: WO2008/088373
PCT Pub. Date: Jul. 24, 2008

(65) Prior Publication Data
US 2010/0046804 A1 Feb. 25, 2010

Related U.S. Application Data

(60) Provisional application No. 60/880,650, filed on Jan. 16, 2007.

(51) Int. Cl.
G06K 9/40 (2006.01)
G06K 9/00 (2006.01)
G06K 9/34 (2006.01)

(52) U.S. Cl.
USPC ............................ 382/275; 382/103; 382/173

(58) Field of Classification Search
USPC ......................... 382/103, 173, 275
See application file for complete search history.

(56) References Cited

U.S. PATENT DOCUMENTS

| 6,201,612 | B1 | 3/2001 | Matsushiro et al. |
| 2003/0001871 | A1* | 1/2003 | Morita ........................ 345/690 |
| 2004/0263538 | A1* | 12/2004 | Ohta et al. .................... 345/690 |
| 2007/0075928 | A1* | 4/2007 | Takeuchi et al. ................ 345/63 |
| 2011/0142134 | A1* | 6/2011 | Wahadaniah et al. .... 375/240.16 |

FOREIGN PATENT DOCUMENTS

| JP | 1992269084 | 9/1992 |
| JP | 08228288 | 9/1996 |
| JP | 1998271331 | 10/1998 |
| JP | 2001163569 | 6/2001 |

(Continued)

OTHER PUBLICATIONS

Wonseok Ahn, et al., "Flat-Region Detection and False Contour Removal in the Digital TV Display", IEEE USA Jul. 6, 2005, pp. 1338-1341, Relevant to Claims 1,12-15, 24.

(Continued)

*Primary Examiner* — Bhavesh M Mehta
*Assistant Examiner* — Utpal Shah
(74) *Attorney, Agent, or Firm* — Robert D. Shedd; Vincent E. Duffy; James McKenzie

(57) ABSTRACT

A system and method of the present disclosure provides a region based error diffusion algorithm or function for reducing artifacts in images. The system and method utilizes knowledge of a region of interest (ROI) in an image and applies effects like dithering or error diffusion to the area or region that shows the artifacts, e.g., a banding phenomenon. The system and method provide for defining a region in at least one first image, the defined region having at least one artifact, tracking the defined region to at least one second image, and applying an error diffusion function to the defined region to mask the at least one artifact in the at least one first and second images.

23 Claims, 5 Drawing Sheets

FOREIGN PATENT DOCUMENTS

| | | |
|---|---|---|
| JP | 2001285640 | 10/2001 |
| JP | 2002177273 | 6/2002 |
| JP | 2005519379 | 6/2005 |
| JP | 2006025378 | 1/2006 |
| WO | WO03073750 | 9/2003 |

OTHER PUBLICATIONS

Eren P.E., et al., "Region-based Affine Motion Segmentation Using Color Information", IEEE USA Apr. 21, 1997, vol. 4, pp. 3005-3008, Relevant to Claims 8-11, 20-23.

Search Report dtd Jul. 11, 2008.

Choi H-R et al "False Contour Reduction Using Directional Dilation and Edge-Preserving Filtering" IEEE Transactions on Consumer Electronics, vol. 52, No. 3, pp. 1099-1106 , Aug. 2006.

Van Heesch F et al; "Masking noise in up-scaled video on large displays" Consumer Electronics, 2005. ICCE. 2005 Digest of Technical Papers. International Conference on Las Vegas, NV, USA Jan. 8-12, 2005, Piscataway, NJ, USA, IEEE, Jan. 8, 2005, pp. 468-470.

\* cited by examiner $$x'_i = m_0 x_i + m_1 y_i + m_2$$

$$y'_i = m_3 x_i + m_4 y_i + m_5$$

where  $(x'_i, y'_i)$   is the position in the next frame
$(x_i, y_i)$   is the position in the current frame

SYSTEM AND METHOD FOR REDUCING ARTIFACTS IN IMAGES

This application claims the benefit under 35 U.S.C. §365 of International Application PCT/US2007/014244, filed Jun. 19, 2007, which was published in accordance with PCT article 21(2) on Oct. 2, 2008, in English and which claims the benefit under 35 U.S.C. §119 of a provisional application 60/880,650 filed in the United States on Jan. 16, 2007.

TECHNICAL FIELD OF THE INVENTION

The present disclosure generally relates to digital image processing and display systems, and more particularly, to a system and method for reducing artifacts in images.

BACKGROUND OF THE INVENTION

Image artifacts are noticed during processing of a digital image, or images such as a sequence of images in a film. A common artifact phenomenon is banding where bands of varying intensity and color levels are displayed on an original smooth linear transition area of the image. Processing like color correction, scaling, color space conversion, and compression can introduce the banding effect. Banding is most prevalent in animation material where the images are man-made with high frequency components and minimum noise. Any processing with limited bandwidth will unavoidably cause alias, "ringing" or banding.

The current state of art is to add noise, such as dithering and error diffusion, to reduce the artifacts in the image. The noise masks the phenomenon to a degree, but introduces undesired noise on other parts of the image, and introduces additional burden to other processing such as compression.

In a related field, due to the large size of the data files required to produce a high quality representation of a digitally sampled image, it is common practice to apply various forms of compression to the data file in an attempt to reduce the size of the data file without adversely affecting the perceived image quality. Various well-known techniques and standards have evolved to address this need. Representative of these techniques is the Joint Photographic Experts Group (JPEG) standard for image encoding. Similar to JPEG, but with the addition of inter-frame encoding to take advantage of the similarity of consecutive frames in a motion sequence is the Moving Pictures Expert Group (MPEG) standard. Other standards and proprietary systems have been developed based on wavelet transforms.

In the process of a commercial movie DVD/HD-DVD release, a digital image that is scanned from conventional film, or from a computer animated movie, typically has 10-bit data and, in certain applications, up to 16-bit data. The data is required to be converted to an 8-bit YUV format for compression. Due to the reduction of bit depth precision, banding artifacts often show up in the areas of the image, or images, with smooth color change. As described above, dithering and error diffusion algorithms are commonly used to reduce the banding artifacts. In most dithering algorithms, a digital signal with high spatial frequency is added to the image to mask out the banding effect. However, the compression inside a DVD/HD-DVD is a lossy compression that removes signals with high spatial frequency. Therefore, the banding artifacts frequently show up after compression even if the banding is masked out by a dithering process before the compression.

The traditional approach for dithering or color depth reduction is for display applications and printing service. Since the dithering is the last step in the To processing chain, added high spatial frequency is well preserved and serves the purpose of masking the banding effect when the color depth is reduced. Error diffusion is another common approach, where a quantization error is distributed around the neighboring pixels to generate masking effects and preserve overall image intensity. However, these approaches fail to consider the effect of a lossy compression, such as like MPEG1, 2, 4 or H.264, which tend to reduce or truncated the high frequency signal. Therefore, most of the dithering and error diffusion approaches will decrease the bit rate efficiency in the compression process, since a compression encoder will use a number of bits to represent the added dithering noise or quantization error and have fewer bits to represent the image. Meanwhile, the banding artifacts are prone to show up after the compression since the masking signal has been reduced or truncated.

Therefore, a need exists for techniques for reducing artifacts in images where the artifacts will remain reduced or suppressed after an image processing, e.g., a lossy compression process.

SUMMARY

A system and method of the present disclosure provides a region based error diffusion process for reducing artifacts in images. The system and method utilizes knowledge of a Region of Interest (ROI) of an image, and applies effects like dithering or error diffusion to the area that shows the artifacts, e.g., the banding phenomenon. The system and method of the present disclosure provides for defining a ROI on the first frame of a scene which shows the phenomenon, and tracks the ROI automatically for a number of frames with the similar characteristics. The system and method provides a smooth transition between the ROI and the rest of image. Furthermore, the present disclosure provides a mechanism to carry information regarding the ROI, e.g., metadata, from acquisition to processing to distribution.

According to one aspect of the present disclosure, a method for reducing artifacts in at least one image is provided. The method includes defining a region in at least one first image, the defined region having at least one artifact, tracking the defined region to at least one second image, and applying an error diffusion function to the defined region to mask the at least one artifact in the at least one first and second images.

In the various described embodiments, the defining a region step is performed manually by outlining the region or automatically by a detection function.

In another aspect, the applying step further includes selecting a block size of pixels of the at least one image, determining if at least one block is within the defined region, adding a masking signal to the at least one block, determining a quantization error for the at least one block in the at least one image, and distributing the quantization error to neighboring blocks.

In further aspect, the adding a masking signal step includes determining a distance of at least one pixel in the at least one block to a boundary of the defined region, and assigning a value to a masking signal associated to the at least one pixel based on the determined distance.

In another aspect, the tracking step further includes generating a binary mask for the defined region of the at least one first image, and projecting the binary mask to the at least one second image to track the defined region. In a further aspect, the projecting step further includes estimating the motion of the defined region from the at least one first image to the at least one second image. In still further aspect, the generating step further includes transforming the defined region into a larger region to capture features of the at least one first image to be tracked.

According to another aspect of the present disclosure, a system for reducing artifacts in at least one image includes a tracking module configured for tracking a defined region in at least one first image to at least one second image, the defined region having at least one artifact, and an error diffusion module configured for applying an error diffusion function to the defined region to mask the at least one artifact in the at least one first and second images. In one embodiment, the system further includes a user interface configured for defining the region in the at least one first image.

According to a further aspect of the present disclosure, a program storage device readable by a machine, tangibly embodying a program of instructions executable by the machine to perform method steps for reducing artifacts in an image is provided, the method including defining a region in at least one first image, the defined region having at least one artifact, tracking the defined region to at least one second image, and applying an error diffusion function to the defined region to mask the at least one artifact in the at least one first and second images.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
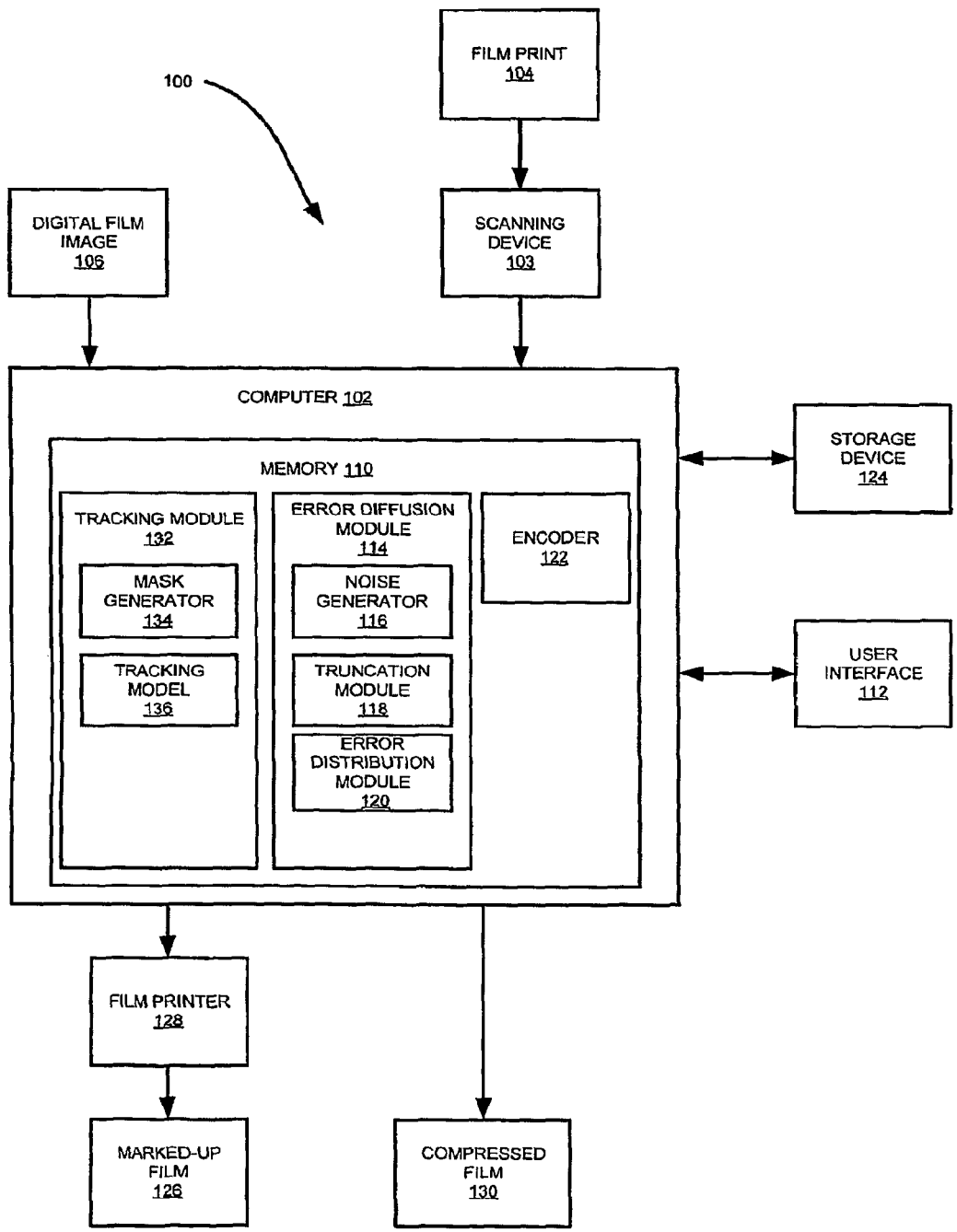
FIG. 1 is an exemplary illustration of a system for reducing artifacts in images according to an aspect of the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the Figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Banding phenomenon can be classified into two categories. In the process of color bit reduction or color quantization, banding can appear due to the reduced signal precision. This type of error can be effectively removed by using an error diffusion algorithm in most of the cases. However, other processes such as color correction, scaling, and color space conversion, contribute to banding artifacts due to their limited processing bandwidth. This type of banding cannot be effectively handled by error diffusion. A masking signal is required to mask out these banding artifacts. The amount of masking signal added is directly related to the intensities of the banding artifacts. Since banding artifacts most likely appear in the smooth linear transition, a frame-based approach will introduce an unnecessary masking signal into regions without banding artifacts, thus reducing the image quality. The system and method of the present disclosure provides a ROI-based (i.e., region of interest based) approach that effectively removes banding of both categories, where the amount of masking signal added can be adjusted by a human operator to achieve the best possible image quality.

A system and method of the present disclosure provides a region based error diffusion algorithm for reducing artifacts in images. The present disclosure provides an interactive system to remove the unpleasant banding phenomenon based on a region of interest (ROI) that is initially defined, e.g., by a human operator or by an automatic detection algorithm or function. The present disclosure also provides a ROI-based error diffusion and band-masking scheme designed to remove the banding in the tracked region, and minimize the side-effects on other processing, e.g., a compression process. For the system to be efficient for practical application in the film/video processing, a region-based tracking algorithm is provided to track the ROI into a number of following frames, thus alleviating the effort of a human operator.

Referring now to the Figures, exemplary system components according to an embodiment of the present disclosure are shown in FIG. 1. A scanning device 103 may be provided for scanning film prints 104, e.g., camera-original film negatives, into a digital format, e.g. Cineon-format or SMPTE DPX files. The scanning device 103 may comprise, e.g., a telecine or any device that will generate a video output from film such as, e.g., an Arri LocPro™ with video output. Alternatively, files from the post production process or digital cinema 106 (e.g., files already in computer-readable form) can be used directly. Potential sources of computer-readable files are AVID™ editors, DPX files, D5 tapes etc.

Scanned film prints are input to a post-processing device 102, e.g., a computer. The computer is implemented on any of the various known computer platforms having hardware such as one or more central processing units (CPU), memory 110 such as random access memory (RAM) and/or read only memory (ROM) and input/output (I/O) user interface(s) 112 such as a keyboard, cursor control device (e.g., a mouse, joystick, etc.) and display device. The computer platform also includes an operating system and micro instruction code. The various processes and functions described herein may either be part of the micro instruction code or part of a software application program (or a combination thereof) which is executed via the operating system. In addition, various other peripheral devices may be connected to the computer platform by various interfaces and bus structures, such a parallel port, serial port or universal serial bus (USB). Other peripheral devices may include additional storage devices 124 and a printer 128. The printer 128 may be employed for printing a revised version of the film 126, e.g., a stereoscopic version of the film.

Alternatively, files/film prints already in computer-readable form 106 (e.g., digital cinema, which for example, may be stored on external hard drive 124) may be directly input into the computer 102. Note that the term "film" used herein may refer to either film prints or digital cinema.

A software program includes an error diffusion module 114 stored in the memory 110 for reducing artifacts in images. The error diffusion module 114 includes a noise or signal generator 116 for generating a signal to mask artifacts in the image. The noise signal could be white noise, Gaussian noise, white noise modulated with different cutoff frequency filters, etc. A truncation module 118 is provided to determine the quantization error of the blocks of the image. The error diffusion module 114 also includes an error distribution module 120 configured to distribute the quantization error to neighboring blocks.

A tracking module 132 is also provided for tracking a ROI through several frames of a scene. The tracking module 132 includes a mask generator 134 for generating a binary mask for each image or frame of a scene. The binary mask is generated from a defined ROI in an image, e.g., by a user input polygon drawn around the ROI or by an automatic detection algorithm or function. The binary mask is an image with pixel value either 1 or 0. All the pixels inside the ROI have a value of 1, and other pixels have a value of 0. The tracking module 132 further includes a tracking model 136 for estimating the tracking information of the ROI from one image to another, e.g., from frame to frame of a scene.

An encoder 122 is provided for encoding the output image into any known compression standard such as MPEG1, 2, 4, h.264, etc.

Figure 2:
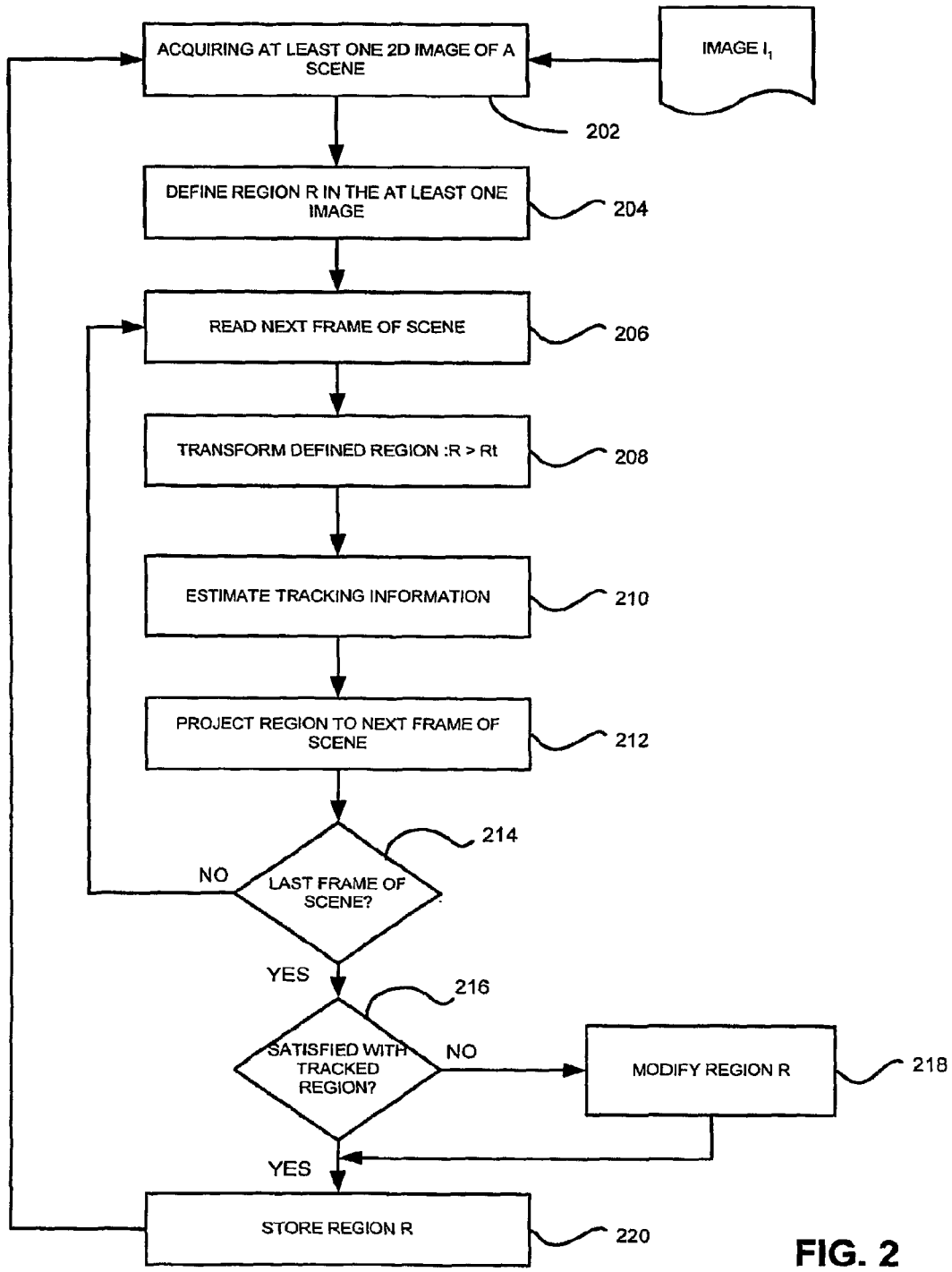
FIG. 2 is a flow diagram of an exemplary method for region-based tracking in images according to an aspect of the present disclosure.

FIG. 2 is a flow diagram of an exemplary method for tracking a region of interest (ROI) in images according to an aspect of the present disclosure. Initially, the post-processing device 102 acquires, at step 202, at least one two-dimensional (2D) image. The post-processing device 102 acquires at least one 2D image by obtaining the digital master video file in a computer-readable format, as described above. The digital video file may be acquired by capturing a temporal sequence of video images with a digital video camera. Alternatively, the video sequence may be captured by a conventional film-type camera. In this scenario, the film is scanned via scanning device 103.

It is to be appreciated that whether the film is scanned or already in digital format, the digital file of the film will include indications or information on locations of the frames, e.g., a frame number, time from start of the film, etc. Each frame of the digital video file will include one image, e.g., $I_1$, $I_2$, ... $I_n$.

Figure 3:
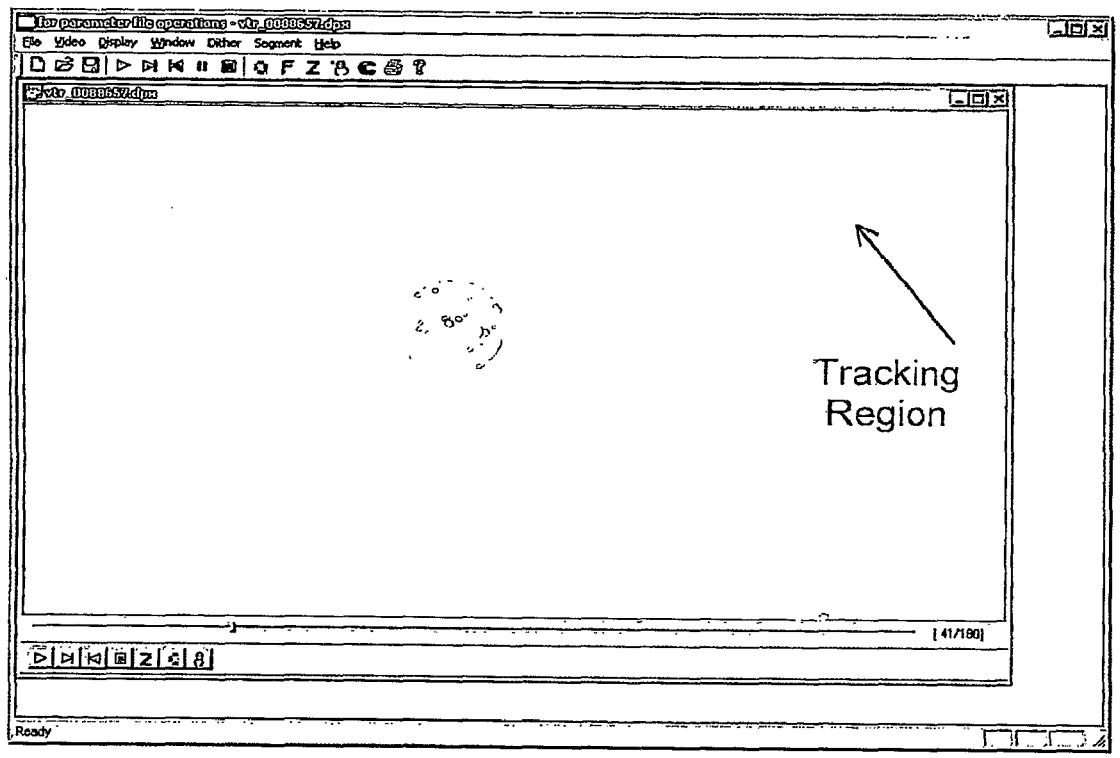
FIG. 3 is an image with a defined region to be tracked.

In step 204, a region of interest R is defined in at least one image. In one embodiment, an operator defines a region with banding artifacts using an interactive user interface such as user interface 112. Referring to FIG. 3, the region is defined by outlining a polygon region onto the image. In another embodiment, the region is detected by an automatic detection algorithm or function. The automatic detection algorithm will interact with a knowledge base complied from a plurality of processed films which will include typical artifacts identified by human operators.

Returning to FIG. 2, from the polygon of the ROI, a binary mask is generated and is used in the system for tracking the ROI. The binary mask is an image with pixel values either 1 or 0. All the pixels inside the polygon have a value of 1, and other pixels have a value of 0. The binary mask can be used to represent a ROI, which is equivalent to the polygon defined ROI. The next frame of the scene is then read in step 206.

Banding artifacts appear in smooth color grading areas. However, a general tracking algorithm requires some distinct features present in the region for a robust and accurate tracking. Thus, a tracking scheme using a different tracking region is provided. In step 208, the ROI R is grown or transformed to a larger region to capture more salient features of the region for tracking. The larger region with some salient features is called tracking region Rt. The region growing algorithm uses the boundary pixels of the ROI as seeds and a "watershed" implementation to grow the region.

Figure 4:
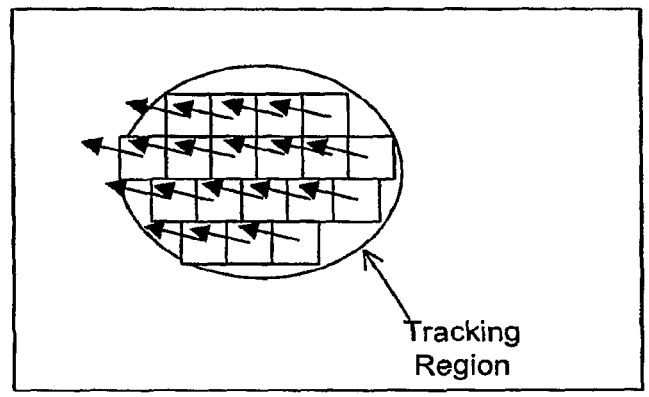
FIG. 4 illustrates a tracking model in accordance with the present disclosure.

For estimating tracking information, a six parameter tracking model 136 (e.g., an affine motion model) is used to track the region (step 210). The tracking region is first divided into 16×16 blocks, and the motion vector for each block is obtained by finding the best block match in the next frame using luminance intensity. The motion vectors of all the blocks are used to estimate the six parameters in the tracking model as shown in FIG. 4. A linear regression procedure is used to find the best parameters which minimize the errors between the predicted pixels and the actual pixels. In step 212, the binary mask of ROI is projected to the next frame using the six parameter tracking model. In step 214, the system determines if the last frame of the scene was processed. If not, the system will return to step 206 until all the frames of the scene are processed. Once ROI is available for a number of frames, the process can be easily applied to the rest of scene automatically.

The system provides real-time feedback on the tracking result. At step 216, an operator can evaluate the result, and modify, at step 218, the ROI if the result is not satisfactory. For example, the operator can view the ROI in a display of the user interface 112 to determine if the ROI was properly tracked. If the operator is not satisfied, the ROI could be modified and the tracking process will be repeated. In step 220, the binary mask of the ROI for each image or frame is stored into a binary file and used as the ROI for ROI-based error diffusion and band masking, as will be described below. Furthermore, the binary mask of ROI is stored into a binary file and can be carried over to the next stage. For example, if the next stage is MPEG4 AVC encoding, the information of ROI can be used by the encoder to allocate proper bits for ROI. This metadata can be stored in storage device 124 and associated with the images so it may be utilized in other processes.

Figure 5:
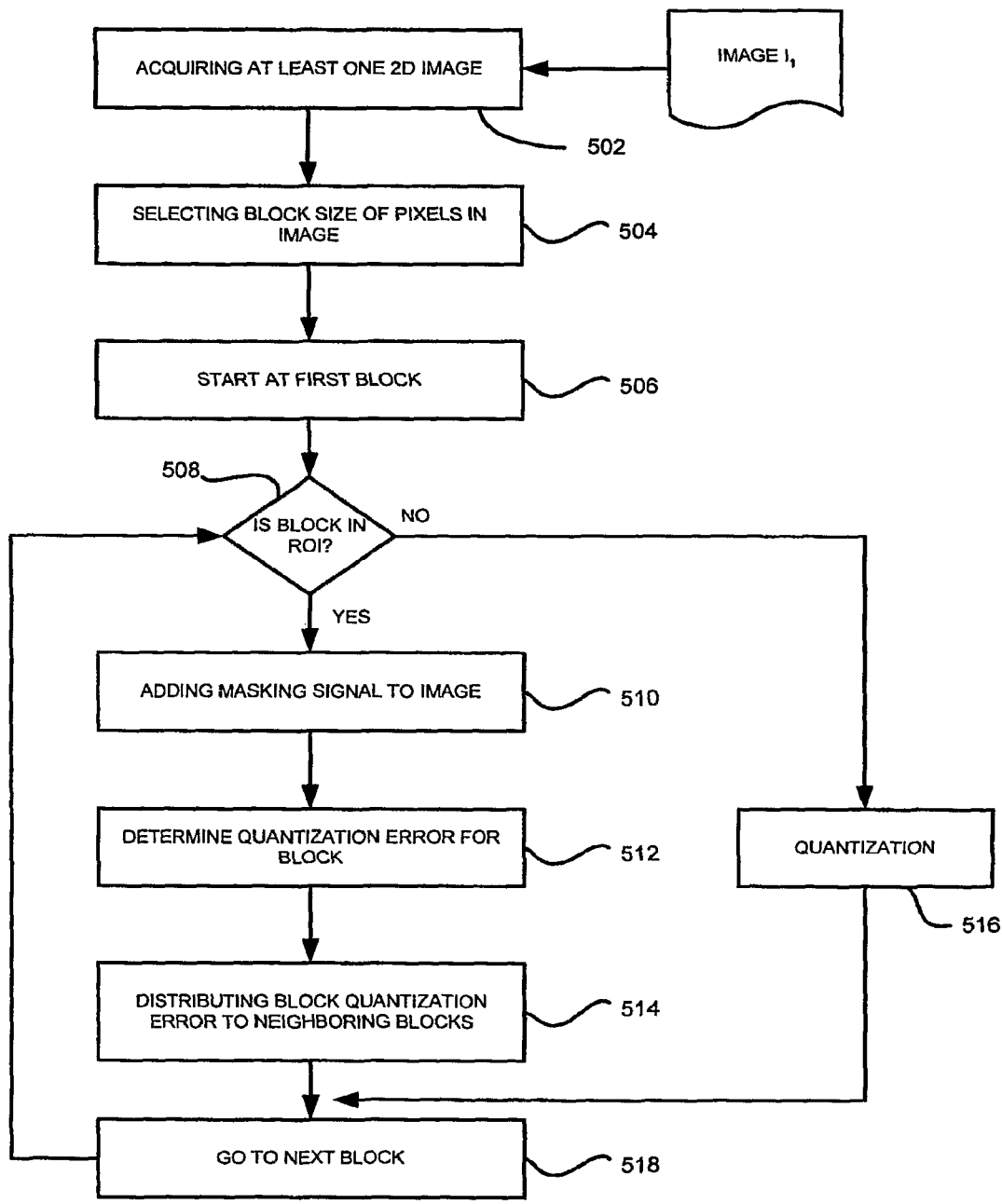
FIG. 5 is a flow diagram of an exemplary method for reducing artifacts in images according to an aspect of the present disclosure.

A flow chart of ROI-based error diffusion and band masking scheme is shown in the FIG. 5. As described above, at least one image to be processed is acquired in step 502.

In step 504, a block size is selected. The image can be divided into any number of blocks. A block is a number of pixels contained in a rectangular region, e.g., $B_{m,n}$, where m,n represent the block index. All of the blocks can have the same size, such as 2×2, 3×3, etc. The block size can also vary depending on local image attributes. The block size can be selected by an operator via the user interface 112, or it can be determined by the image size so that a constant ratio is kept for different image sizes. The error diffusion method of the present disclosure is working on the block level, as will be described below. Once the block size is selected, the block size will be kept the same for the same image.

It is to be appreciated that the block size can vary from a single pixel to any arbitrary size, such as 2×2, 2×3, 4×4. The usage of different block sizes gives the system control of the spatial frequency of the masking signal. This is important if the following process is lossy compression, which tends to remove high spatial frequency. Adding a well-controlled masking signal will reduce the compression artifacts and avoid the banding re-appearing after lossy compression.

Once the block size is selected, all the blocks which make up the image will be processed starting, at step 506) with a first block. Initially, the system, at step 508, will determine if the block is in the defined region of interest (ROI). If the block is not in the ROI, a simple quantization scheme is used, at step 516, to reduce the color bit depth, e.g., the least significant bits of the block are eliminated and the quantization error is not compensated. After step 516, the system, at step 518, will go to the next block in the image.

If the block is in the ROI, in step 510, a noise signal, e.g., a masking signal, is added to the image via noise generator 116. Levels from 0 to 255 are assigned to pixels based on their distance, e.g., closeness, to the region boundary. The distance of at least one pixel in the block to a boundary of the defined region is determined and a value of a masking signal associated to the at least one pixel is assigned based on the determined distance. These levels are used to scale down the intensity of the masking signal, thus making a smooth transition in the region boundary area. The mean and variance of the pixel color values in the ROI is calculated. If a pixel's color difference from the mean is three times larger than the variance, it indicates that there is a significant feature that will not likely be the banding artifacts. To preserve this feature, level 0 is assign to this pixel, which means no noise will be added this pixel. An example of this is a scene of blue sky with stars, as shown in FIG. 3, where banding artifacts appear in the sky. An operator can select the blue sky as the ROI for de-banding processing. All the stars in the sky are properly preserved as their color value is significantly different from the mean value of pixels in ROI.

In step 512, a quantization error is determined for the block. Initially, a truncation function is performed on each block in the image via truncation module 118. The truncation function is employed to reduce the bit depth for each pixel in the block by dividing the bit depth value with a constant quantization factor Q, that is a power of 2. Generally, the quantization factor Q is equal to $2^X$, where x is the number of bits to be truncated. For example, for truncation from 10-bit data to 8-bit data, the constant quantization factor Q will be 4, i.e., $Q=2^2$. The truncating function is defined as the following:

$$I'_{i,j} = \frac{I_{i,j} + N_{i,j}}{Q}, I_{i,j} \in B_{m,n} \quad (1)$$

where $I_{i,j}$ is the pixel value inside the block, $N_{i,j}$ is the signal added before the truncation by the noise generator 116, and Q is the quantization factor. $I'_{i,j}$ is the truncated pixel value. In the truncation process, there is a rounding issue to be taken care of for the pixel values. For example, if $I'_{i,j}$ is equal to 1.75, i.e., 7 ($I'_{i,j}+N_{i,j}$) divided by 4 (Q), $I'_{i,j}$ will need to be represented by an integer number. $I'_{i,j}$ can be 2 or 1 based on different rounding schemes as are known in the art.

Inside equation 1, $N_{i,j}$ is noise, e.g., white noise, and it reduces structure artifacts. Generally, $N_{i,j}$ has a random signal distribution. Via user interface 112, an operator can manually control the value range of $N_{i,j}$. By default, the value range of $N_{i,j}$ is from 0 to Q−1. By using the same noise for each pixel inside a selected block of the image, the noise pattern's spatial frequency will be low inside the block, which reduces the overall spatial frequency of the noise in the whole image. Since the spatial frequency of the noise is reduced, the noise, i.e., the masking signal, will survive the compression process and suppress artifacts during decompression.

Next, a quantization error is determined for each pixel inside the block as shown in equation (2) below and, the summation of all the quantization errors produces the block quantization error $E_{m,n}$, which is distributed into the neighboring blocks based on error diffusion coefficients.

$$E_{m,n} = \sum_{i,j}(I_{i,j} - QI'_{i,j}) \quad (2)$$

For the total block quantization error $E_{m,n}$, a portion of the quantization error e will be distributed to the neighboring blocks as determined by $$e = c(m,n)*E \quad (3)$$

where c(m,n) is an error diffusion coefficient.

In step 514, block quantization error is distributed to the neighboring blocks via error distribution module 120. The error distribution function inside each block is defined as following:

$$I_{i,j} = I_{i,j} + w_{i,j}e, I_{i,j} \in B_{m,n} \quad (4)$$

$$w_{i,j} = \frac{1}{NM} I_{i,j} \in B_{m,n} \quad (5)$$

where e is the total error distributed to the block $B_{m,n}$, N,M are the dimension of the block, $w_{i,j}$ is the weighting coefficients for block $B_{m,n}$. In one embodiment, the uniform distribution as shown in equation (5) is used to calculate the weighting coefficients. More complex function can be designed to calculate $w_{i,j}$, e.g., $w_{i,j}$ can be set proportional to the l(i,j).

The size of block $B_{m,n}$ determines the amount of spatial frequency that can be controlled in the error diffusion process and is chosen to achieve the best effect of masking the artifacts. However, a large block size tends to generate structured artifacts, which is not desirable in the error diffusion process. Such structured artifacts include block-boundary artifacts where 2 neighboring pixels in two different blocks will be transformed differently. $N_{i,j}$ in equation 1 is also used to destroy the potential structured artifacts with random noise inclusion. An exemplary block size of 2×2 has been found to be sufficient to process an image of 720×480 pixels (e.g., DVD resolution) with no visible block artifacts. It is to be appreciated other block sizes and image sizes may be employed with no resultant visible artifacts.

After the quantization has been performed in either step 516 or by steps 510 through 514, the system, at step 518, will proceed to the next block in the image until all the blocks in the image are processed. After the image has been modified by the error distribution function, the image may be saved in a memory of the post-processing device, e.g., in storage device 124. Once all the images of a particular film have been modified, the images may be encoded via encoder 122 according to any conventional compression standard, such as MPEG1, 2, 4, h.264, etc. The compressed film 130 may then be stored in a storage device, e.g., storage device 124, or transferred to a removable storage device, e.g., a DVD.

Although the embodiment which incorporates the teachings of the present disclosure has been shown and described in detail herein, those skilled in the art can readily devise many other varied embodiments that still incorporate these teachings. Having described preferred embodiments for a system and method for reducing artifacts in images (which are intended to be illustrative and not limiting), it is noted that modifications and variations can be made by persons skilled in the art in light of the above teachings. It is therefore to be understood that changes may be made in the particular embodiments of the disclosure disclosed which are within the scope and spirit of the disclosure as outlined by the appended claims.

What is claimed is:

1. A method for masking artifacts in images, the method comprising:
    defining a region in at least one first image, the defined region having at least one artifact;
    tracking the defined region to at least one second image; and
    applying an error diffusion function to the defined region to mask the at least one artifact in the at least one first and second images comprising adding a masking signal to at least one block in at least one first image and at least one second image based on a block size of pixels.

2. The method as in claim 1, wherein the applying step further comprises:
    selecting a block size of pixels of an image;
    adding the masking signal to the at least one block;
    determining a quantization error for the at least one block in the image; and
    distributing the quantization error to neighboring blocks.

3. The method of claim 2, further comprising, after the distributing step, encoding the at least one first and second images with a compression function.

4. The method as in claim 3, wherein the compression function is lossy.

5. The method as in claim 2, wherein the adding a masking signal step comprises:
    determining a distance of at least one pixel in the at least one block to a boundary of the defined region; and
    assigning a value to a masking signal associated to the at least one pixel based on the determined distance.

6. The method as in claim 2, wherein the masking signal is a noise signal.

7. The method as in claim 2, wherein the determining the quantization error step further comprises:
    truncating each pixel in the at least one block;
    determining a quantization error for each pixel; and
    summing the quantization error of each pixel in the at least one block.

8. The method as in claim 1, wherein the tracking step further comprises:
    generating a binary mask for the defined region of the at least one first image; and
    projecting the binary mask to the at least one second image to track the defined region.

9. The method as in claim 8, wherein the projecting step further comprises estimating motion of the defined region from the at least one first image to the at least one second image.

10. The method as in claim 9, wherein the estimating step is performed by an affine motion model.

11. The method as in claim 8, wherein the generating step further comprises transforming the defined region into a larger region to capture features of the at least one first image to be tracked.

12. The method as in claim 1, wherein the defining a region step is performed manually by outlining the region or automatically by a detection function.

13. A system for masking artifacts in images, the system comprising:
    a tracking module configured for tracking a defined region in at least one first image to at least one second image, the defined region having at least one artifact; and
    an error diffusion module configured for applying an error diffusion function to the defined region to mask the at least one artifact in the at least one first and second images comprising adding a masking signal to at least one block in at least one first image and at least one second image based on a block size of pixels.

14. The system as in claim 13, further comprising a user interface configured for defining the region in the at least one first image.

15. The system as in claim 13, further comprising an encoder configured for encoding the at least one first and second images with a compression function.

16. The system as in claim 13, wherein the error diffusion module further comprises a signal generator configured for generating a masking signal to be applied to at least one image; wherein the error diffusion module is further configured for selecting a block size of pixels of the at least one image, determining a quantization error for the at least one block in the at least one image; and distributing the quantization error to neighboring blocks.

17. The system as in claim 16, wherein the signal generator is configured to generate a noise signal.

18. The system as in claim 16, wherein the error diffusion module is further configured for determining a distance of at least one pixel in the at least one block to a boundary of the defined region; and assigning a value to a masking signal associated to the at least one pixel based on the determined distance.

19. The system as in claim 16, wherein the error diffusion module further comprises a truncation module configured to truncate each pixel in the at least one block, determine a quantization error for each pixel and sum the quantization error of each pixel in the at least one block.

20. The system as in claim 13, wherein the tracking module further comprises a mask generator configured for generating a binary mask for the defined region of the at least one first image; wherein the tracking module is further configured for projecting the binary mask to the at least one second image to track the defined region.

21. The system as in claim 20, wherein the tracking module further comprises a tracking model configured to estimate motion of the defined region from the at least one first image to the at least one second image.

22. The system as in claim 21, wherein the tracking model is an affine motion model.

23. The system as in claim 20, wherein the tracking module is further configured for transforming the defined region into a larger region to capture features of the at least one first image to be tracked.

* * * * *